US011901136B2

(12) United States Patent
Podesta

(10) Patent No.: US 11,901,136 B2
(45) Date of Patent: Feb. 13, 2024

(54) MULTI-LAYERED CONDUCTIVE SPRING

(71) Applicant: Jacob Podesta, Ladera Ranch, CA (US)

(72) Inventor: Jacob Podesta, Ladera Ranch, CA (US)

( * ) Notice: Subject to any disclaimer, the term of this patent is extended or adjusted under 35 U.S.C. 154(b) by 246 days.

(21) Appl. No.: 17/446,671

(22) Filed: Sep. 1, 2021

(65) Prior Publication Data

US 2022/0076903 A1 Mar. 10, 2022

Related U.S. Application Data

(60) Provisional application No. 63/075,115, filed on Sep. 5, 2020.

(51) Int. Cl.

| | |
|---|---|
| ***H01H 13/20*** | (2006.01) |
| ***H01H 13/14*** | (2006.01) |
| ***H01H 13/70*** | (2006.01) |

(52) U.S. Cl.

CPC ............ *H01H 13/20* (2013.01); *H01H 13/14* (2013.01); *H01H 13/70* (2013.01); *H01H 2235/01* (2013.01)

(58) Field of Classification Search

CPC ........ H01H 13/20; H01H 13/14; H01H 13/70; H01H 2235/01; H01H 2215/002; H01H 2215/05; H01H 2217/006; H01H 13/84; H01H 37/32; H01H 37/323; H01H 3/12; H01H 13/705; H01H 13/7065; H01H 13/7073; H01H 2037/0087

See application file for complete search history.

(56) References Cited

U.S. PATENT DOCUMENTS

| | | | | |
|---|---|---|---|---|
| 7,332,688 | B2 * | 2/2008 | Browne ................. | B60K 37/06 200/341 |
| 11,551,891 | B2 * | 1/2023 | Kurma Raju ........ | H01H 37/323 |
| 11,557,444 | B2 * | 1/2023 | Lai ....................... | H03K 17/943 |
| 2015/0285228 | A1 | 10/2015 | Koehler et al. | |
| 2017/0276122 | A1 | 9/2017 | Van Den Aker | |
| 2020/0108951 | A1 | 4/2020 | Cahoy et al. | |
| 2020/0276700 | A1 | 9/2020 | Alambeigi et al. | |
| 2020/0331639 | A1 | 10/2020 | Mindock et al. | |
| 2021/0045291 | A1 | 2/2021 | O'Brien | |
| 2021/0095646 | A1 | 4/2021 | Blecha et al. | |

* cited by examiner

*Primary Examiner* — Lheiren Mae A Caroc

(74) *Attorney, Agent, or Firm* — Burns Patent Law

(57) ABSTRACT

A mechanical component is provided. The component can have a core, a sheath circumferentially surrounding the core, and an insulator between the core and the sheath. The core can include a shape memory material that is arranged to move from an initial form to an activated form upon a temperature of the core warming past a transition temperature of the shape memory material. A distal portion of the sheath can be in electrical communication with a distal portion of the core, while the insulator blocks a flow of electrical current between a proximal portion of the sheath and a proximal portion of the core.

12 Claims, 8 Drawing Sheets

MULTI-LAYERED CONDUCTIVE SPRING

INCORPORATION BY REFERENCE TO ANY PRIORITY APPLICATIONS

This application claims priority to U.S. Provisional Application No. 63/075,115, filed Sep. 5, 2020, and entitled "MULTI-LAYERED CONDUCTIVE SPRING," the disclosure of which is hereby incorporated by reference in its entirety.

BACKGROUND

Shape memory materials can shift between a martensite phase and austenite phase depending on the temperature of the material. This property can be used to drive shape changing in items such as, for example, a nitinol cardiovascular stent that changes shape from an initial compact form at room temperature to an expanded implanted form upon the stent warming to body temperature.

In certain arrangements, electrical current can be passed through the shape memory material to warm the shape memory material and induce the material phase transition that drives a shape change in the shape memory material. Certain mechanical actuators place a shape memory component in tension between two electrodes. Passing electric current through the shape memory material can warm the shape memory material past its transition temperature, inducing a martensite to austenite phase change in the shape memory material. This phase transition of the shape memory material can drive a shape change in the shape memory component placed in tension between the two electrodes. In certain designs, the shape change of the component can in turn change the distance between, or tension applied to, the electrodes that were used to warm the shape memory material.

SUMMARY

Disclosed herein are embodiments of a shape memory material component configured such that a positive terminal and a negative terminal for driving current through the shape memory component can be located at one end of the component. In some aspects, the component can be a mechanical component that includes a core, a sheath, and an insulator. The core can have a proximal end, a distal region, and an intermediate region connecting the distal region with the proximal end. The core can include or be made from an electrically-conductive shape memory material that is shaped into an initial form. The core can be further configured to move from the initial form to an activated form different in shape from the initial form upon a temperature of the core warming past a transition temperature of the shape memory material. The sheath can be arranged to surround circumferentially the core. The sheath can include or be made from an electrically-conductive material. The sheath can include a distal portion that is configured to be in electrical communication with a distal portion of the core. The insulator can be disposed between the core and the sheath. The insulator can be configured to block a flow of electrical current between a proximal portion of the sheath and a proximal portion of the core.

In certain arrangements, the mechanical component can be arranged as a coil or helical spring. In certain aspects, a proximal end of the sheath can extend along the core to within 2 centimeters of the proximal end of the core. In certain aspects, a distance of a proximal end of the sheath from the proximal end of the core can be within: 0.5 centimeters, 1.0 centimeter, 2 centimeters, 3 centimeters, and other values between any of the aforementioned values. In some aspects, the component can further include a first terminal and a second terminal, the first terminal configured to be in electrical communication with the sheath, the second terminal configured to be in electrical communication with the core. In some aspects, a ratio of a thickness of the sheath to a radius of the core is: between 0.01 and 0.25; between 0.02 and 0.2; between 0.05 and 0.1. In some aspects, the core is configured so that the core has an initial form at a first temperature that is below the transition temperature and warming the core past the transition temperature causes the core to change from the initial form to an activated form that is different in shape compared to the initial form. In some aspects, the core is further configured so that the initial form has a first spring constant that is greater than a second spring constant of the activated form. In some aspects, the core is further configured so that the initial form has a first spring constant that is less than a second spring constant of the activated form.

In certain arrangements, a plurality or group of shape memory components can be attached at their proximal ends to a circuit board. In some aspects, the group or collection of two or more components can be arranged as a console, a controller, a mechanical keyboard, or a tactile interface.

In certain variants, a console includes a circuit board and a shape memory component having a proximal end in electrical connection with the circuit board. A distal end of the shape memory component can include a button. The shape memory component can include a core that is in electrical connection with the circuit board and a sheath that is in electrical connection with the circuit board. The sheath can be arranged such that the sheath coaxially surrounds at least a portion of the core. In some variants, the console can further include an additional shape memory component in electrical connection with the circuit board.

Also disclosed herein are methods of inducing a shape memory transition in a component a shape memory alloy component. In some aspects, the method can include: electrically coupling the core of a wire forming the component to a ground; electrically coupling a conductive sheath of the wire to a voltage source, wherein the conductive sheath circumferentially surrounds the core. In some aspects, the method can include establishing a first electrical connection between a first terminal and a proximal portion of a sheath layer of the component; establishing from a second electrical connection between a second terminal and a proximal portion of a core of the component, the core disposed coaxial with and radially inward of the sheath layer; and passing an electrical current between the first terminal and the second terminal, thereby warming the core past a transition temperature and inducing the shape memory transition.

Also disclosed herein are embodiments of a method of making a shape memory component configured to be activated at one end. In some aspects, the method can include: annealing a core made from or including a shape memory material while the core is an activated shape and in an austenite phase of the shape memory material; shifting, or allowing to shift, the shape memory material to a martensite phase; coating the core with an insulator; removing a portion of the insulator at a distal end of the core; coating at least a portion of the core distal end and insulator with an electrically-conductive sheath; forming a proximal region of the insulator so that the proximal end of the insulator extends proximally beyond a proximal end of the sheath; forming a proximal region of the core so that the proximal end of the core extends proximally beyond the proximal end of the sheath and extends further beyond the proximal end of the insulator; and shaping the core into an initial shape.

BRIEF DESCRIPTION OF THE DRAWINGS

Embodiments of the present disclosure will now be described hereinafter, by way of example only, with reference to the accompanying drawings in which.

DETAILED DESCRIPTION

Overview

This disclosure relates generally to mechanical components that are made from, or include, a shape memory material, and to methods of inducing the shape memory material of the mechanical component to undergo a shape change. In some aspects, the shape memory material can be an alloy (e.g., nitinol). Nitinol can reference an alloy that contains nickel and titanium. In certain aspects, nitinol can include an alloy having a 55%:45% by-weight blend of nickel with titanium. In some arrangements, one or more physical characteristics of mechanical components disclosed herein can be changed by inducing a shape change in the shape memory material of the mechanical component.

Shape Memory Alloy Component

Figure 1A:
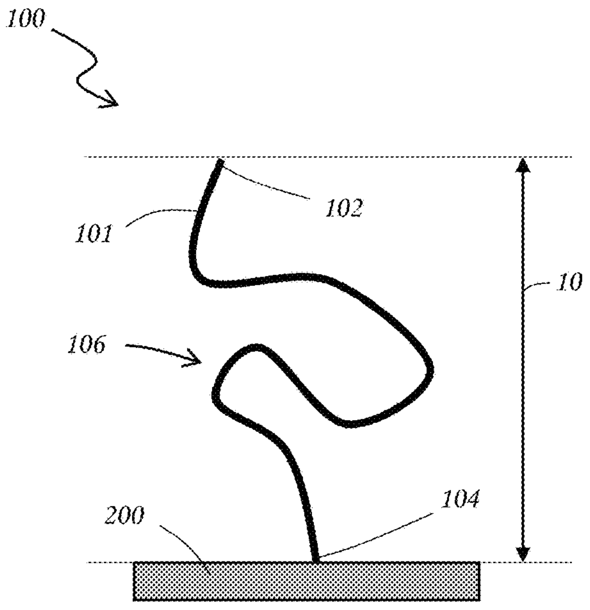
FIG. 1A illustrates a shape memory component attached to a circuit board, according to some aspects of the present disclosure.

FIG. 1A illustrates an illustrative, non-limiting example of a mechanical component 100. The component 100 can comprise or include a shape memory material. The component 100 can have a distal end 102, a proximal end 104, and an intermediate portion 106. The intermediate portion 106 can connect directly or indirectly the distal end 102 and the proximal end 104. In the depicted component 100, the distal end 102 is free and the proximal end 104 is attached to a circuit board 200. When the shape memory material of the component 100 is in its martensite phase, the component 100 can have an first shape or initial form 101. The initial shape 101 can define a placement of the distal end 102 relative to the proximal end 104. In some aspects, the initial shape 101 can be the form or shape of the component 100 with the shape memory material of the component 100 in a first material phase (e.g., 100% martensite). As shown in FIG. 1A, the distal end 102 can be located a first vertical distance 10 away from the distal end 104 when the component 100 is in its initial form 101.

Figure 1B:
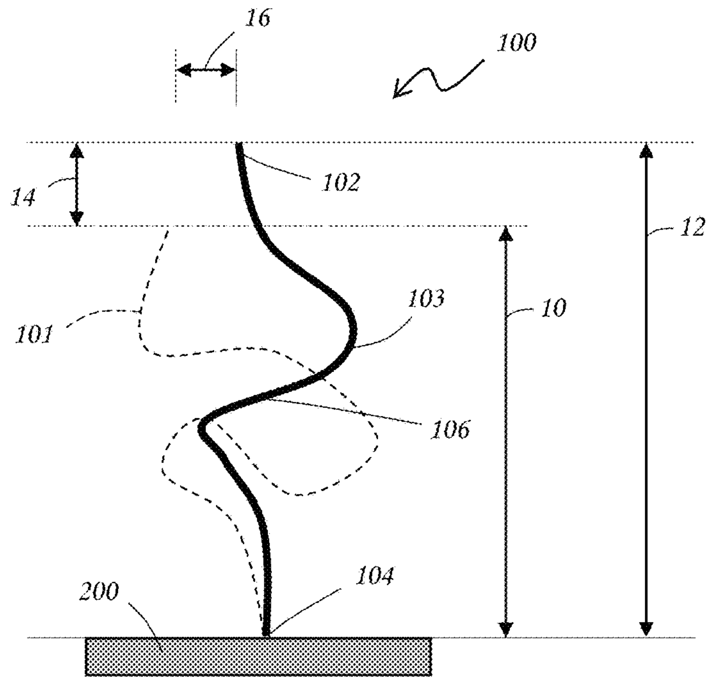
FIG. 1B illustrates the shape memory component of FIG. 1A after the component has undergone a shape change due to warming of its shape memory material, according to some aspects of the present disclosure.

FIG. 1B illustrates the mechanical component 100 of FIG. 1A after the component 100 has undergone a shape change. In some aspects, the shape change can be driven by a phase transition of the shape memory material of the component 100, as described herein. The shape change can move the component 100 from its initial form 101 to a subsequent or activated form 103. As shown in FIG. 1B, the distal end 102 of the component 100 can be located a second vertical distance 12 away from the proximal end 104 when the component 100 is in its activated form 103 (e.g., 100% austenite). A vertical travel distance 14 of the distal end 102 can be defined by comparing the vertical position of the distal end 102 when the component 100 is in the initial form 101 to the vertical position of the distal end 102 when the component is in the activated form 103. Similarly, a horizontal travel distance 16 can be defined by comparing the horizontal position of the distal end 102 when the component 100 is in the initial form 101 to the horizontal position of the distal end 102 when the component 100 is in the activated form 103.

FIGS. 1A and 1B illustrate a component 100 that is configured to move its distal end 102 further from, and to the right of, its proximal end 104 as the shape memory material of the component 100 undergoes a shape change to change its initial form 101 to its activated form 103. In some aspects, this shape change can be driven by a martensite to austenite phase transition. In some arrangements, the component 100 can be configured such that the shape change moves the distal end 102 toward the proximal end 104, or only in the horizontal direction, or only in the vertical direction, or only in a rotational direction without moving beyond or toward the proximal end 104, or in other combinations of the aforementioned directions such as in a rotational direction while moving away from the proximal end 104.

Figure 2A:
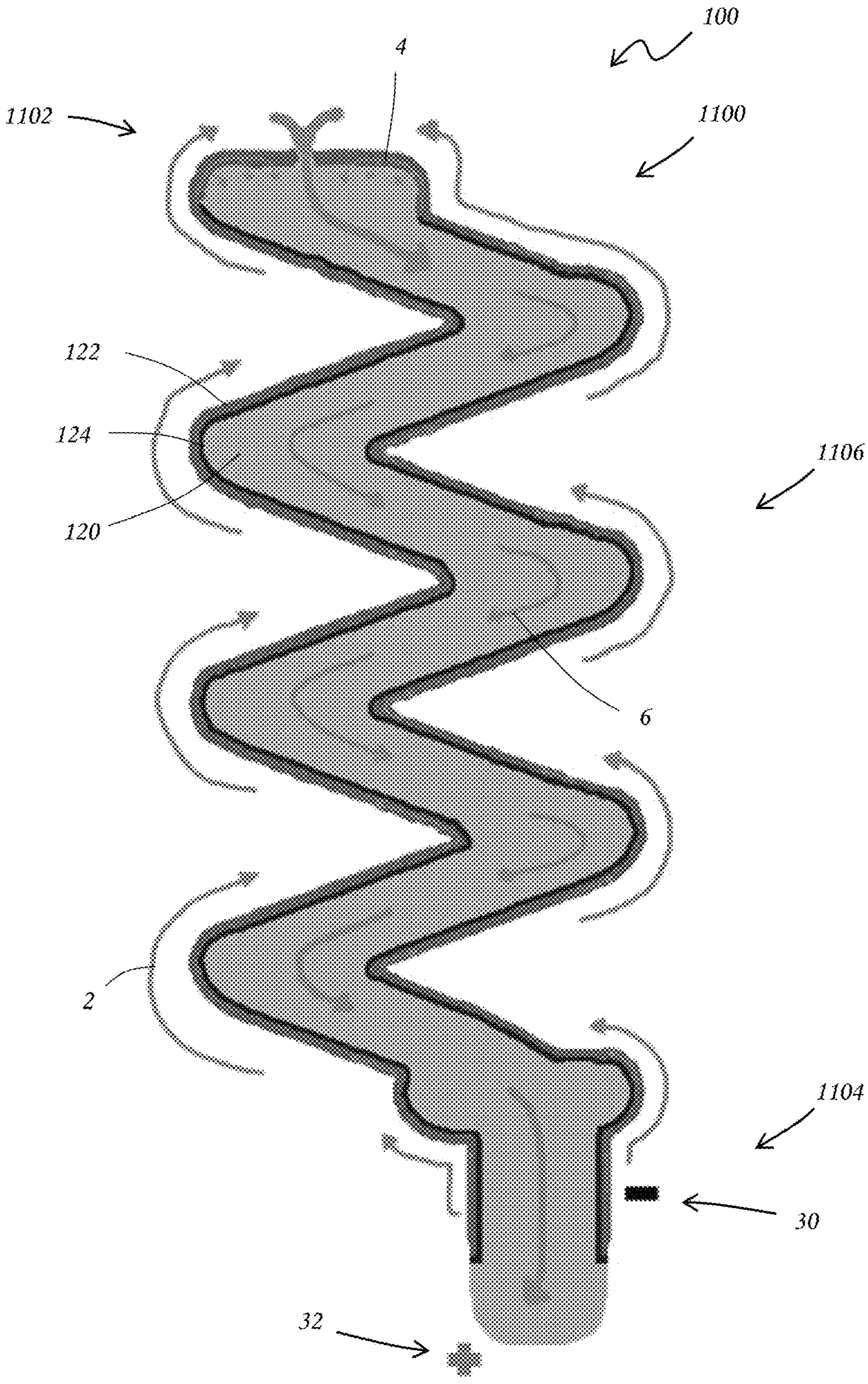
FIG. 2A illustrates a flow of electrical current through a shape memory component formed as a helical spring, according to some aspects of the present disclosure.

FIG. 2A illustrates a component 100 formed as a helical spring 1100. In some aspects, the helical spring 1100 can have multiple coaxial layers. In some arrangements, the component 100 can have a shape memory core 120 surrounded by an electrically-conductive sheath 122 and an insulator 124 disposed between at least a portion of the core 120 and the sheath 122. As shown in FIG. 2A, electrical current can be passed through the spring 1100 by connecting near the proximal end 1104 a first terminal 30 to the sheath 122 and a second terminal 32 to the core 120. The insulator 124 can be configured to block the flow of electrical current between the core 120 and the sheath 122 in the intermediate region 1106 of the spring 1100. At the proximal end 1104, the insulator 124 can be configured to block the flow of electrical current from shorting directly between the first and second terminals 30, 32. In some aspects, the proximal end of the insulator 124 can extend proximally beyond the proximal end of the sheath 122. The insulator 124 can further be configured to direct a proximal-sheath electrical current 2 from the proximal end 1104 to the distal end 1102 within the sheath 122, as described herein. At the distal end 1102, the insulator 124, or lack thereof, can be configured to allow a distal-sheath electrical current 4 to cross from the sheath 122 to the core 120. The core 120 can be configured to conduct an intermediate-core electrical current 6 from the distal end 1102 to the proximal end 1104 within the core 120.

In some aspects, the shape memory component 100 can be activated by making electrical connections with only one end of the component 100. The illustrative, non-limiting embodiment shown in FIG. 2A illustrates that electrical current can be pass through the component 100 by connecting the first terminal 30 to the sheath 122 near the proximal end 1104 and connecting a second terminal 32 to the core 120 near the proximal end 1104. In some aspects, the component 100 can be configured to form the electrical connections at the first and second terminals 30, 32 by soldering a proximal portion of the component 100 to a circuit board 200 (FIG. 1A).

The proximity or nearness of the first and second terminals 30, 32 to the proximal end 104 of a component 100 can be defined in terms of geometry of the component 100. For example, the helical spring 1100 of FIG. 2A makes roughly three and one-half circumferential revolutions, giving the spring 1100 a total component length of roughly three and one-half circumferences of a coil. In some aspects, the first and second terminals 30, 32 can be within the first proximal turn of the spring 1100 or within the proximal-most coil-circumference length of spring 1100. In some aspects, the first and second terminals 30, 32 can each be located within the first or second proximal turns of a helical spring 1100.

Turning back briefly to FIG. 1B, proximity of the first and second terminals 30, 32 to the proximal end 104 of the component 100 can also be defined in terms of a percentage of the total height of the component 100. For example, the first vertical distance 10 indicates the total vertical distance between the distal and proximal ends 102, 104 when the component 100 is in the initial form 101. In some aspects, the first and second terminals 30, 32 can be disposed within the proximal 10% of the first vertical distance 10 of the component 100. In some aspects, the percentage of the first vertical distance 10 in which the first and second terminals 30, 32 are disposed within of the proximal end 104 can be: 1%, 2%, 5%, 10%, 25%, 50%, and other values between any of the aforementioned values.

Figure 2B:
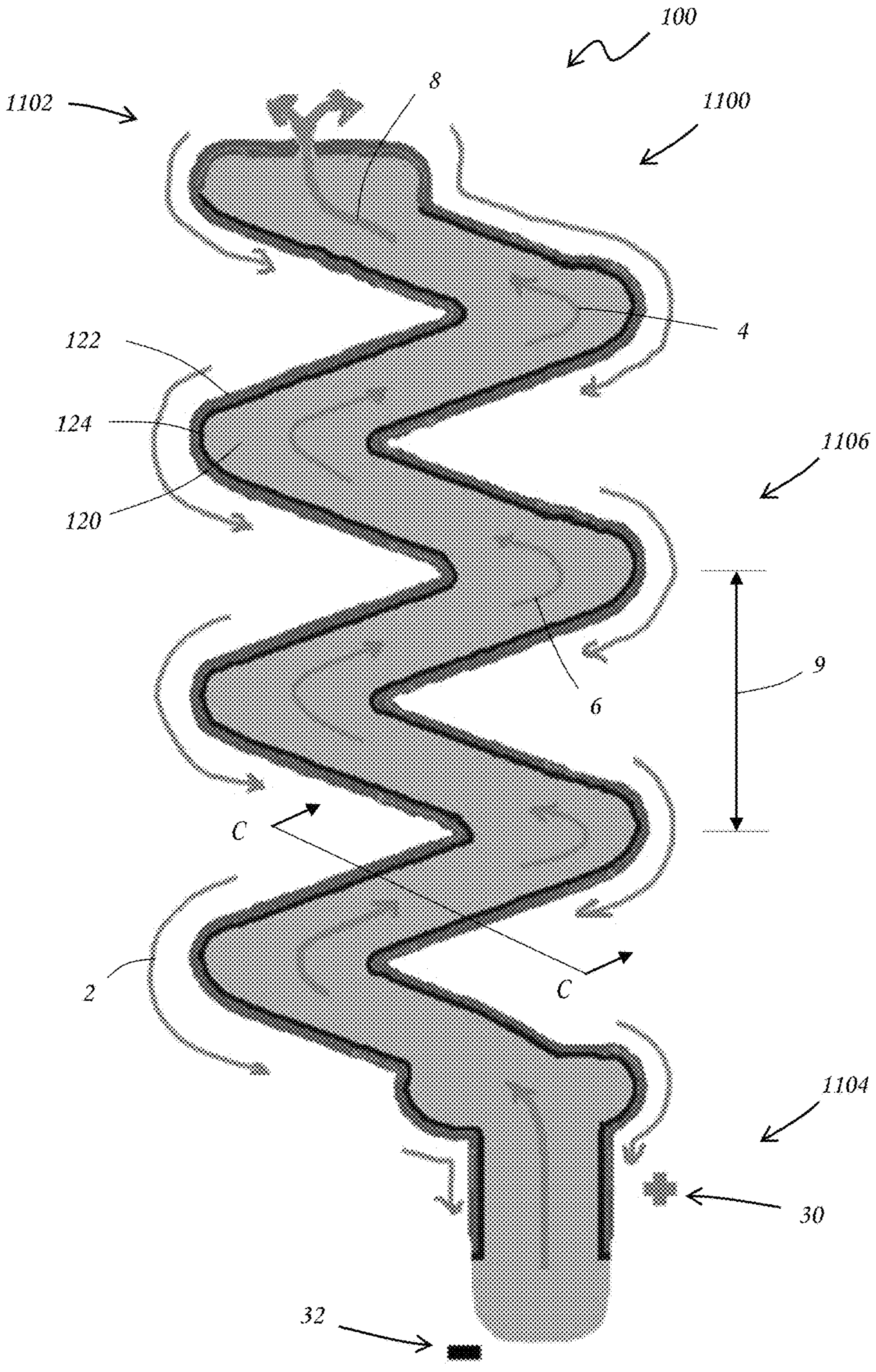
FIG. 2B illustrates a flow of electrical current through the helical spring of FIG. 2A when the polarity at the proximal end of the spring is reversed, according to some aspects of the present disclosure.

Returning to FIG. 2B, which illustrates the spring 1100 with the polarity of the first and second terminals 30, 32 reversed compared with the polarity shown in FIG. 2A. Reversing the polarity between the core 120 and sheath 122 at the proximal end 1104 can reverse the direction of electrical current flow through the spring 1100. As shown in FIG. 2B, the intermediate-core electrical current 6 can proceed within the core 120 in a direction from the proximal end 1104 to the distal end 1102. Similarly, a distal-core-flow 8 can cross from the core 120 to the sheath 122 at the distal end 1102, and the proximal-sheath electrical current 2 can complete the flow of electrical current from the first terminal 30 to the second terminal 32, as shown in FIG. 2B.

In some aspects, the component 100 can be configured so that the flow of electrical current through the spring 1100 heats the core 120. The flow of electrical current through the core 120 can warm the core 120 past the transition temperature of the shape memory material of the component 100. In some aspects, warming the shape memory core 120 past its transition temperature can drive the core 120 to undergo a shape change to move the spring 1100 from an initial coil configuration to a subsequent or activated coil configuration, as described herein.

FIG. 2B shows a side view of a helical spring 1100 that makes approximately three and a half revolutions along its length. A coil-thread distance 9 can be defined as the vertical distance traveled along the axis of the spring 1100 to move between two adjacent and alike circumferential positions of the spring 1100, as noted in FIG. 2B. In some arrangements, the coil characteristics of the spring 1100 can change as the component 100 moves from its initial form 101 to its activated form 103. For example, the shape change can cause the coil thread distance 9 to increase for one or more coils of the spring 1100, or the shape change can cause the coil thread distance 9 decrease for one or more coils of the spring 1100. In some aspects, the coil of the spring 1100 may become more tightly wound so that the number of coils increases along the length of the spring 1100. In some aspects, the coil of the spring 1100 may become more loosely wound so that the number of coils decreases along the length of the spring 1100. In some aspects, the shape change may cause the diameter of one or more coils to reduce. In some aspects, the shape change may cause the diameter of one or more coils to increase. In some aspects, a spring coefficient of the component 100 can increase when the component 100 moves from its initial for 101 to its activated form 103. In some aspects, a spring coefficient of the component 100 can decrease when the component 100 moves from its initial form 101 to its activated form 103. In some arrangements, the shape change can cause the spring 1100 to change both its height (e.g., by changing the vertical position of the distal end 1102) and its spring constant (e.g., by changing the tightness of the coiling of the spring 1100).

Figure 2C:
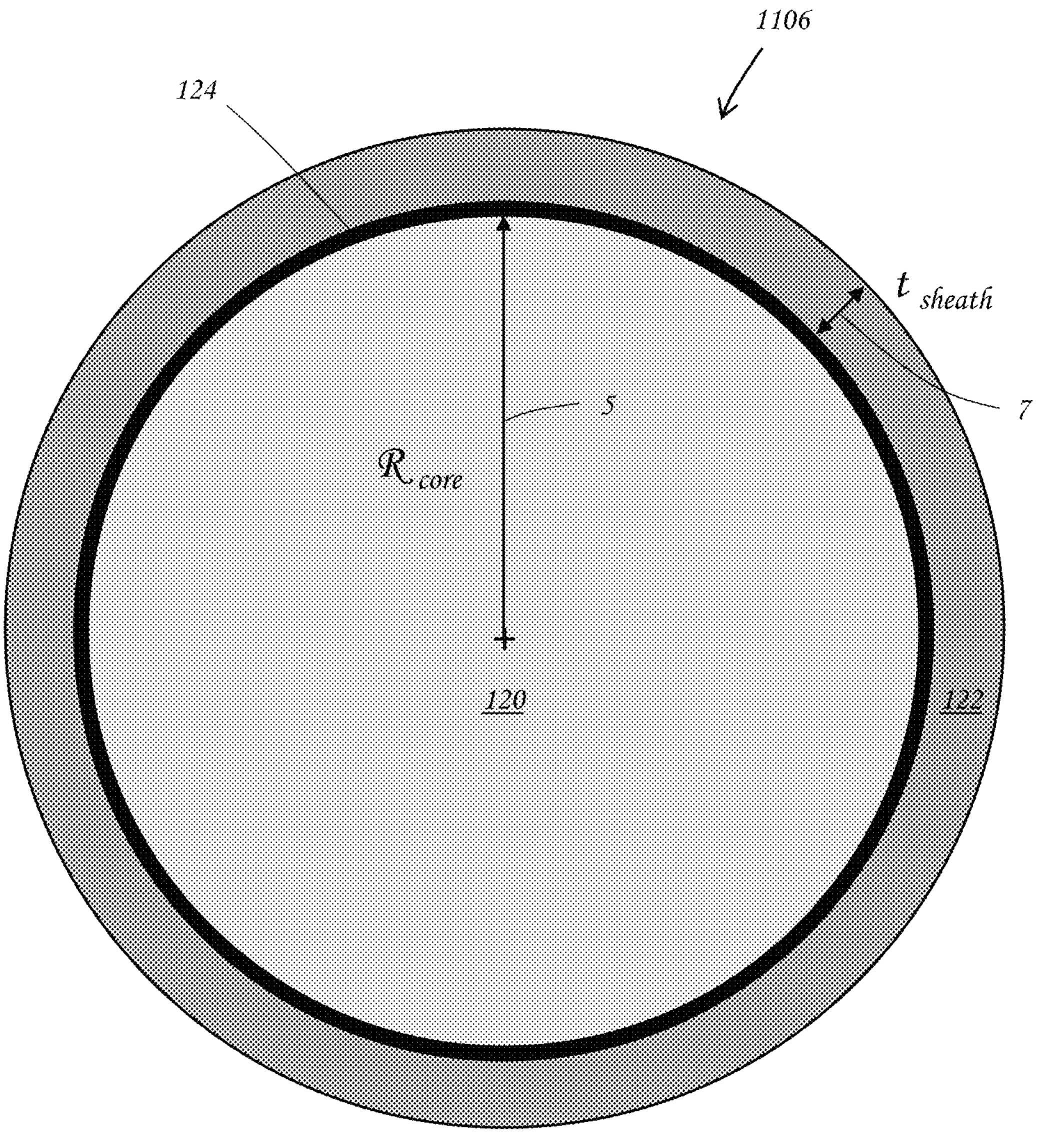
FIG. 2C illustrates a cross-sectional axial view of an intermediate portion of the helical spring along the line of view denoted by "C" in FIG. 2B, according to some aspects of the present disclosure.

FIG. 2C depicts a cross-sectional axial view of the intermediate portion 1106 of the spring 1100, viewed along the line of view denoted by "C" in FIG. 2B. As shown in FIG. 2C, the core 120 can have a core radius 5. The sheath 122 can have a sheath thickness 7. The sheath thickness 7 can be selected so that the sheath 122 is sufficiently thick to carry electrical current effectively yet thin enough that the sheath 122 does not significantly oppose the bending moments of the core 120 as the core 120 undergoes a shape change. In some aspects, a ratio of the sheath thickness 7 to the core radius 5 can be: between 0.01 and 0.25; between 0.02 and 0.2; between 0.05 and 0.1. In some aspects, a ratio of the thickness of the insulator 124 to the core radius 5 can be: between 0.001 and 0.25; between 0.002 and 0.1; between 0.005 and 0.05.

Figure 3A:
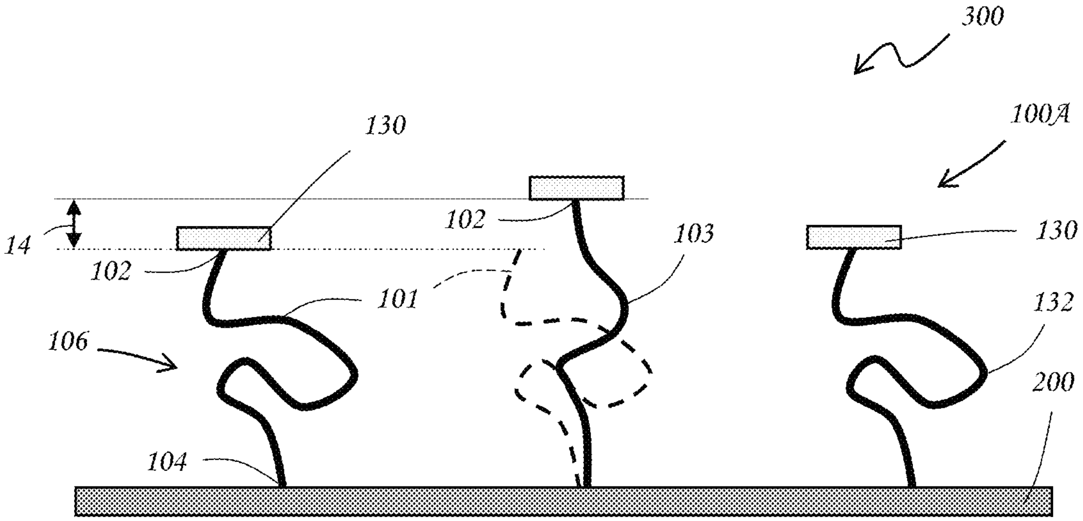
FIG. 3A illustrates a group of shape memory components attached to a circuit board, according to some aspects of the present disclosure.

FIG. 3A depicts a side view of a group 300 of components 100A connected to a circuit board 200. Each of the group of components 100A can have a tab 130 attached to the distal end 102 of a shape memory stalk 132. In some aspects, the tab 130 can be a key of a keyboard or a button on a controller. The shape memory stalk 132 can move from an initial form 101 to an activated form 103 upon the stalk 132 being warmed passed the transition temperature of the shape memory material, as described herein. The circuit board 200 can be configured to connect electrically with the proximal end 104 of the stalk 132, as described herein. The circuit board 200 can be configured to deliver electric current to the proximal end 104 of each of the one or more components 100A. In the illustrated embodiment, the circuit board 200 has delivered electric current to warm and change the shape memory material of the stalk 132 of the component 100A in the middle of the group 300 of three components 100A. In the illustrated embodiment, the shape change of the stalk 132 from its initial form 101 to its activated form 103 has caused the tab 130 to rise away from the circuit board 200 by a vertical travel distance 14.

Figure 3B:
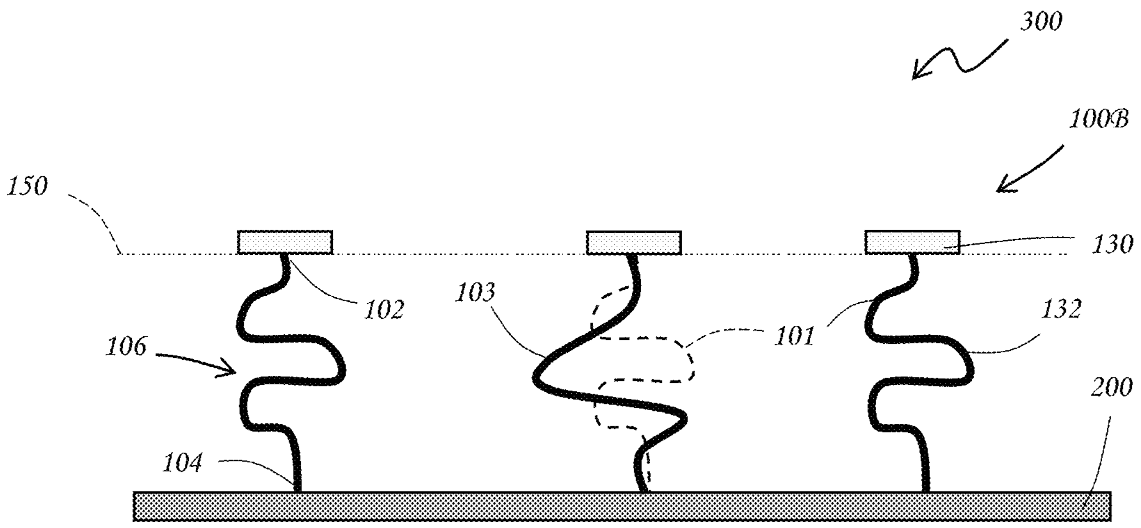
FIG. 3B illustrates a group of shape memory components attached to a circuit board, according to some aspects of the present disclosure.

FIG. 3B depicts a side view of a group 300 of components 100B connected to a circuit board 200. Each of the group of components 100B can have a tab 130 and a shape memory stalk 132, as described herein with respect to components 100A. In the illustrated embodiment, the circuit board 200 has delivered electric current to warm and change the shape memory material of the stalk 132 of the component 100B in the middle of the group 300 of three components 100B. In the illustrated embodiment, the shape change of the stalk 132 from its initial form 101 to its activated form 103 has caused the tab 130 to remain at substantially the same distance away from the circuit board 200, as shown in FIG. 3B by the tab 130 remaining substantially at the same distance from a reference line 150 when the stalk 132 is in its initial form 101 and in its activated form 103. However, as described herein, FIG. 3B is illustrating that a spring constant of the stalk 132 can change when the stalk 132 is activated to undergo a shape change from its initial form 101 to its activated form 103. In some arrangements, the group 300 of components 100 can include a first subset of components that have a stalk 132 configured to move the tab 130 relative to the circuit board 200 when the stalk 132 is activated to undergo a shape change from its initial form 101 to its activated form 103, and a second subset of components that have a stalk 132 configured to keep the tab 130 substantially unchanged with respect to its distance away from the circuit board 200 when the stalk 132 is activated to undergo a shape change from its initial form 101 to its activated form 103. In some arrangements, the group 300 of components 100 can include a first subset of components that have a stalk 132 configured to change a spring constant of the stalk 132 when the stalk 132 is activated to undergo a shape change from its initial form 101 to its activated form 103, and a second subset of components that have a stalk 132 configured to keep a spring constant of the stalk 132 substantially unchanged when the stalk 132 is activated to undergo a shape change from its initial form 101 to its activated form 103.

Figure 4:
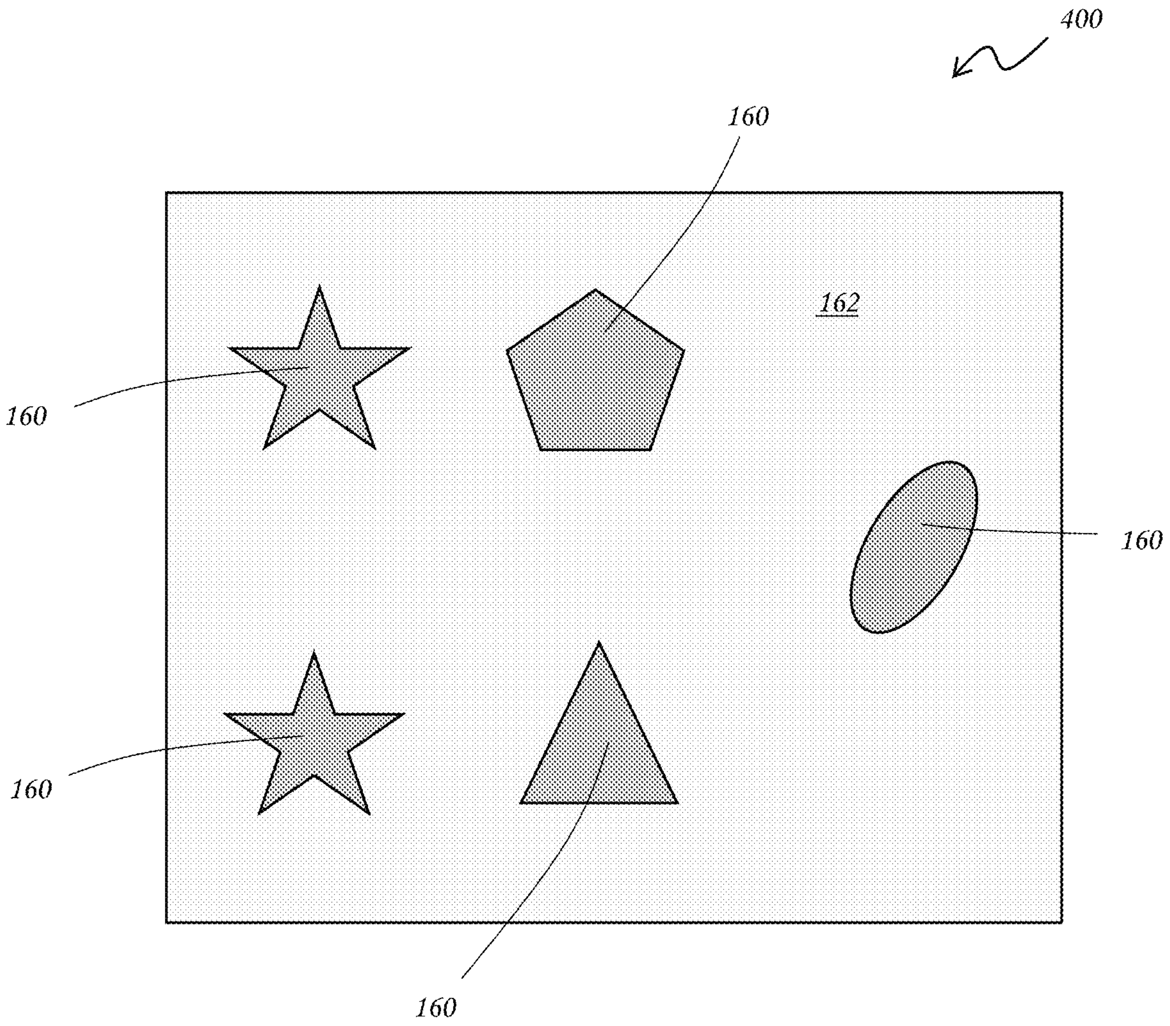
FIG. 4 illustrates a top view of a console having a plurality of shape memory components.

FIG. 4 depicts a top view of a console 400 having a plurality of different types of buttons 160. In some aspects, the buttons 160 can be the tab 130 of a component 100 that is connected to a circuit board 200 by a shape memory stalk 132, as described herein. The buttons 160 can extend, or otherwise be accessible, through a top surface 162 of the console 400. The console 400 can be configured so that the position of the button 160 relative to the top surface 162 can change when the circuit board 200 activates a shape change in the stalk 132 to which the button 160 is connected. The console 400 can be configured so that spring constant of the stalk 132 to which the button 160 is connected changes when the circuit board 200 activates a shape change in the stalk 132. In some aspects, changing the spring constant of the stalk 132 changes the force required to move the button 160 toward or past the top surface 162. In some variants, the spring constant of the stalk 132 can change (increase or decrease) with the tab 130 remaining substantially fixed relative to the top surface 162 of the console 400. In some variants, the spring constant of the stalk 132 can change (increase or decrease) with the tab 130 moving relative to the top surface 162 of the console 400. In some aspects, the console 400 can be a mechanical keyboard in which the stalk 132 is a nitinol spring that replaces a conventional steel spring of the keyboard. The stalk 132 can be configured so that electricity applied to the stalk 132, as disclosed herein, can be used to increase the level of strength required to press that key of the mechanical keyboard that is associated with the stalk 132. In some arrangements, the stalk 132 can be configured so that applying electricity to the stalk 132 reduces the level of strength that is required to press the mechanical keyboard key associated with the stalk 132.

Figure 5:
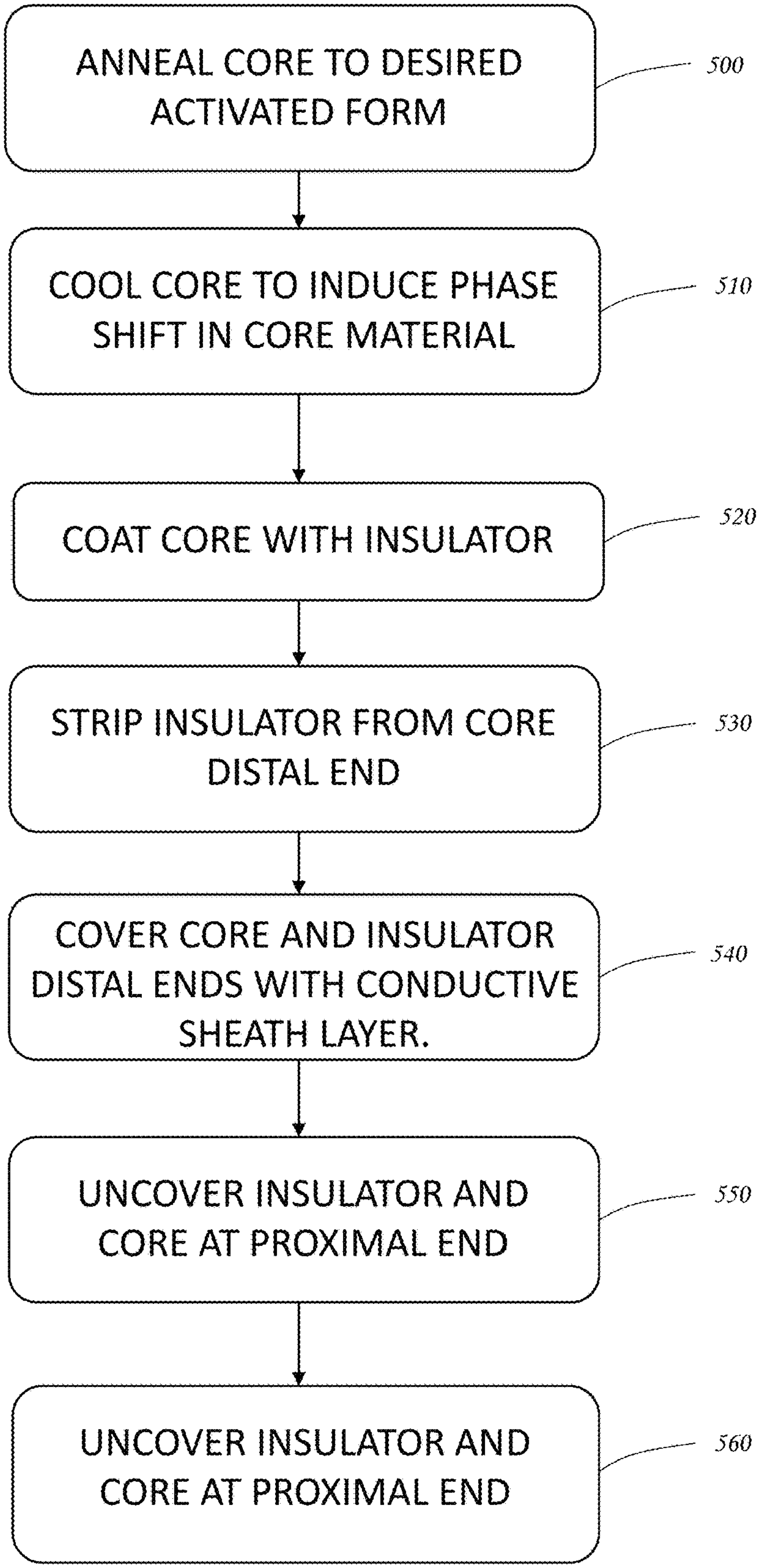
FIG. 5 illustrates a method of making a shape memory component, according to some aspects of the present disclosure.

FIG. 5 shows a schematic diagram of a method of making a shape memory component 100 that can be activated to undergo a shape change by electrically connecting a proximal region of the component to an electric circuit. The method can include an annealing step 500 in which a nitinol core 120 is annealed in a desired activated shape 103 while the core 120 is in the austenite phase of the nitinol. The method can include a cooling step 510 in which the nitinol core 120 is cooled to allow the nitinol material to shift to its martensite phase. The method can include a coating step 520 in which the nitinol core 120 is coated with an insulator 124. The method can include a stripping step 530 in which a portion of the insulator 124 can be removed at the distal end 102 of the core 120. The method can further include a covering step 540 in which a thin sheath 122 of conductive material is applied over the insulator 124 and distal region of the core 120. The method can include an insulator uncovering step 550 in which a proximal region of the insulator 124 is arranged by removing a portion of the sheath 122 or otherwise arranging the insulator 124 so that the proximal region of the insulator 124 extends proximally beyond the proximal end of the sheath 122 and the proximal region of the core 120 extends proximally beyond a proximal end of the sheath 122 and further beyond a proximal end of the insulator 124. The method can include a cold shaping step 560 in which the nitinol core 120 can be shaped into its initial shape 101 while the shape memory material of the nitinol core 120 is in a martensite phase.

Other Variations and Terminology

While certain embodiments have been described, these embodiments have been presented by way of example only, and are not intended to limit the scope of protection. Indeed, the novel methods and systems described herein may be embodied in a variety of other forms. It will be understood by those skilled in the art that the present disclosure extends beyond the specifically disclosed embodiments to other alternative embodiments or uses and obvious modifications and equivalents thereof, including embodiments which do not provide all of the features and advantages set forth herein. Furthermore, various omissions, substitutions, and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed; others may be added. Accordingly, the scope of the present disclosure is not intended to be limited by the specific disclosures of preferred embodiments herein, and may be defined by claims as presented herein or as presented in the future. The language of the claims is to be interpreted broadly based on the language employed in the claims and not limited to the examples described in the patent specification of during prosecution of the application, which examples are to be construed as non-exclusive.

Features, materials, characteristics, or groups described in conjunction with a particular aspect, embodiment, or example are to be understood to be applicable to any other aspect, embodiment, or example described herein unless incompatible therewith. All of the features disclosed in this specification (including any accompanying claims, abstract, and drawings), or all of the steps of any method or process so disclosed, may be combined in any combination, except combinations where at least some of such features or steps are mutually exclusive. The protection extends to any novel one, or any novel combination, of the features disclosed in this specification (including any accompanying claims, abstract, and drawings), or to any novel one, or any novel combination, of the steps of any method or process so disclosed.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of the stated amount. As another example, the terms "generally parallel" and "substantially parallel" may refer to a value, amount, or characteristic that departs from exactly parallel by less than 15 degrees.

What is claimed is:

1. A mechanical component comprising:

a core having a proximal end, a distal region, and an intermediate region connecting the distal region with the proximal end, the core comprising a shape memory material shaped into an initial form, the core configured to move from the initial form to an activated form upon a temperature of the core warming past a transition temperature of the shape memory material;

a sheath circumferentially surrounding the core, a distal portion of the sheath configured to be in electrical communication with a distal portion of the core; and an insulator disposed between the core and the sheath, the insulator configured to block a flow of electrical current between a proximal portion of the sheath and a proximal portion of the core.

2. The mechanical component of claim 1, wherein a proximal end of the sheath is disposed less than 2 centimeters away from the proximal end of the core.

3. The mechanical component of claim 1, further comprising a first terminal and a second terminal, the first terminal in electrical communication with the sheath, the second terminal in electrical communication with the core.

4. The mechanical component of claim 1, wherein a ratio of a thickness of the sheath to a radius of the core is between 0.01 and 0.25.

5. The mechanical component of claim 1, wherein the core has the initial form at a first temperature of the core that is below the transition temperature and warming the core past the transition temperature causes the core to change from the initial form to the activated form that is different in shape compared to the initial form.

6. The mechanical component of claim 5, wherein the initial form has a first spring constant that is greater than a second spring constant of the activated form.

7. The mechanical component of claim 5, wherein the initial form has a first spring constant that is lesser than a second spring constant of the activated form.

8. A mechanical keyboard comprising:

the mechanical component of claim 1;

a button affixed to the distal region; and a circuit board in electrical communication with the proximal portion of the sheath and the proximal portion of the core.

9. The mechanical keyboard of claim 8 further comprising an additional shape memory component having a shape memory stalk, a proximal end of the shape memory stalk in electrical connection with the circuit board.

10. The mechanical keyboard of claim 9, wherein a spring constant of the shape memory stalk is configured to change upon the circuit board delivering an electrical current to the shape memory stalk.

11. The mechanical keyboard of claim 10, wherein the spring constant decreases upon the electrical current warming the shape memory stalk past a transition temperature of the shape memory stalk.

12. The mechanical keyboard of claim 10, wherein the spring constant increases upon the electrical current warming the shape memory stalk past a transition temperature of the shape memory stalk.

* * * * *